(12) United States Patent
Jiroku

(10) Patent No.: US 8,654,293 B2
(45) Date of Patent: Feb. 18, 2014

(54) LIQUID-CRYSTAL APPARATUS, METHOD FOR MANUFACTURING THE SAME, AND ELECTRONIC DEVICE

(75) Inventor: Hiroaki Jiroku, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 377 days.

(21) Appl. No.: 13/019,652

(22) Filed: Feb. 2, 2011

(65) Prior Publication Data

US 2011/0194060 A1    Aug. 11, 2011

(30) Foreign Application Priority Data

Feb. 8, 2010   (JP) .................................. 2010-025178

(51) Int. Cl.
*G02F 1/1333*   (2006.01)
*G02F 1/136*   (2006.01)
(52) U.S. Cl.
USPC ........................................... 349/138; 349/43
(58) Field of Classification Search
USPC ......................................................... 349/138
See application file for complete search history.

(56) References Cited

U.S. PATENT DOCUMENTS

| 6,429,132 | B1 | 8/2002 | Haskell et al. | |
| 8,098,351 | B2* | 1/2012 | Kar-Roy | 349/113 |
| 2004/0135952 | A1* | 7/2004 | Kurashina et al. | 349/139 |
| 2004/0171262 | A1* | 9/2004 | Takayama et al. | 438/691 |
| 2006/0116000 | A1* | 6/2006 | Yamamoto | 438/795 |

FOREIGN PATENT DOCUMENTS

JP    10-039332 A    2/1998

* cited by examiner

*Primary Examiner* — Bumsuk Won
*Assistant Examiner* — Charles Chang
(74) *Attorney, Agent, or Firm* — ALG Intellectual Property, LLC

(57) ABSTRACT

A liquid-crystal apparatus has an element substrate. This element substrate contains depressions inside, and these depressions are sealed with an insulating film, a silicon dioxide coating. To this end, the insulating film is formed by chemical vapor deposition, and this coating process lasts until voids formed in the depressions are closed at the top by the insulating film. Then, the insulating coating is ground. This grinding process lasts until the insulating film is flat, but should be terminated before the voids are opened.

10 Claims, 7 Drawing Sheets

FIG. 5A1
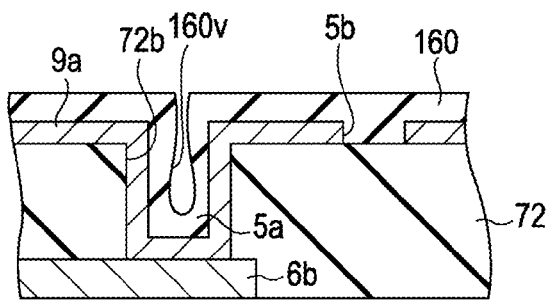
FIG. 5B1
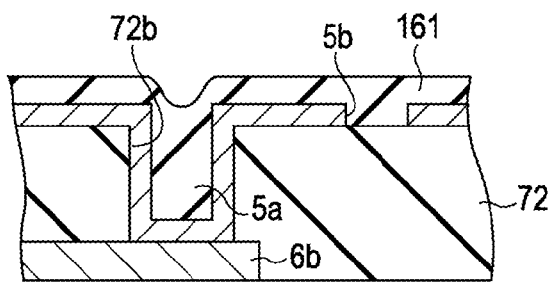
FIG. 5A2
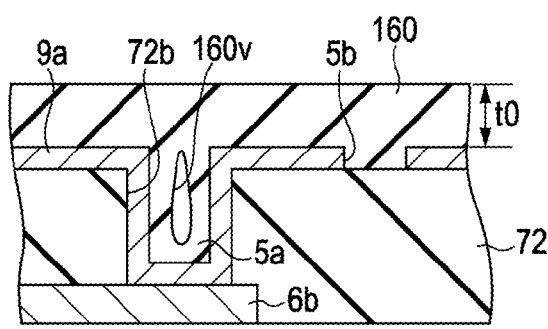
FIG. 5B2
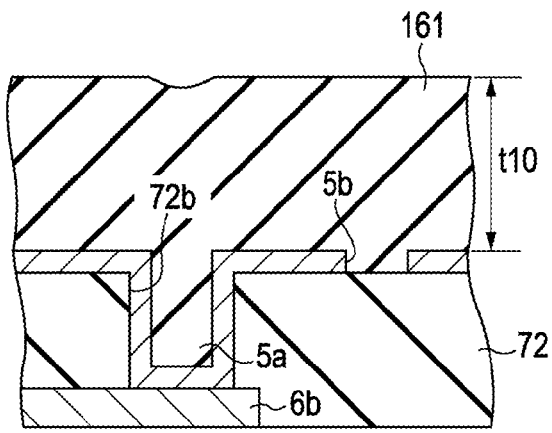
FIG. 5A3
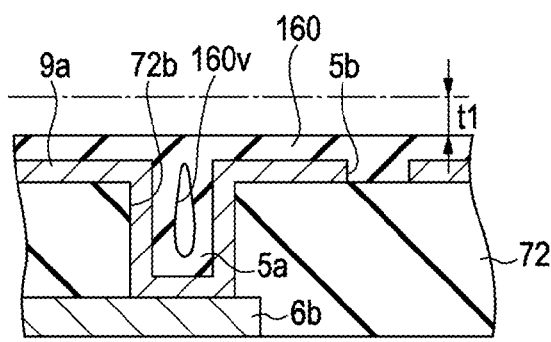
FIG. 5B3
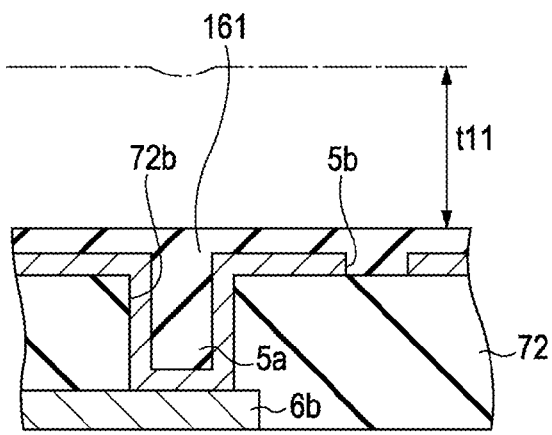

LIQUID-CRYSTAL APPARATUS, METHOD FOR MANUFACTURING THE SAME, AND ELECTRONIC DEVICE

Japanese Patent Application No. 2010-025178, filed Feb. 8, 2010 is incorporated by reference in its entirety herein.

BACKGROUND

1. Technical Field

The present invention relates to a liquid-crystal apparatus, a method for manufacturing the liquid-crystal apparatus, and an electronic device equipped with the liquid-crystal apparatus.

2. Related Art

Liquid-crystal apparatuses have an element substrate and another substrate facing it, namely, an opposite substrate. The element substrate has pixel electrodes formed thereon, and the opposite substrate and the element substrate sandwich a liquid-crystal layer therebetween. The element substrate has some more elements and layers placed thereon; for example, pixel transistors, pixel electrodes, an insulating coating, and an oriented coating are layered in this order. Preferably, the uppermost layer of the element substrate is flat. Some measures can be taken to achieve this. A possible solution is to seal depressions, which are due to the formation of contact holes or the presence of pixel electrodes, in the lower layers with a metal coating or the insulating coating. A typical case can be seen in a structure in which a lower conductive layer and pixel electrodes are electrically connected via contact holes formed in an interlayer insulating coating. This type of structure allows depressions to be formed beneath the oriented coating to spread over the inner wall of the contact holes. Thus, the contact holes (depressions) are plugged up with a coating made of molybdenum, tungsten, or some other appropriate metal.

However, as described in JP-A-10-39332, plugging up all depressions requires forming a metal coating to a thickness enough for the complete sealing of the depressions and subsequently grinding the metal coating. Unfortunately, the constitutions described in this publication are unfavorable in terms of productivity because it takes a long time to form the metal coating and grind it and for other reasons. To make matters worse, this method is costly; it involves the use of a coater that can produce a metal coating of good step coverage and the use of a grinder for metal surfaces, and such machines are usually expensive.

SUMMARY

Advantages of some aspects of the invention are to provide a liquid-crystal apparatus that has a flat layer on depressions and can be produced with no need for spending long periods of time for the formation and grinding of the coating covering the depressions, to provide a method for manufacturing such a liquid-crystal apparatus, and to provide an electronic device equipped with such a liquid-crystal apparatus.

An aspect of the invention is a liquid-crystal apparatus having an element substrate, pixel transistors arranged on this element substrate, pixel electrodes corresponding to these pixel transistors, depressions formed on these pixel electrodes, an insulating coating formed to cover the pixel electrodes and the depressions, and voids formed in the depressions and closed by the insulating coating.

Another aspect of the invention is a method for manufacturing a liquid-crystal apparatus having an element substrate, pixel transistors arranged on this element substrate, pixel electrodes corresponding to these pixel transistors, and an insulating coating formed to cover the pixel electrodes. This method includes the following processes: forming the pixel electrodes and then depressions on the pixel electrodes; forming the insulating coating to cover the pixel electrodes and the depressions until voids formed in the depressions are closed by the insulating coating; and grinding the insulating coating to some extent while keeping the voids closed.

In these aspects of the invention, any depressions are plugged up with the insulating coating formed thereon; the uppermost layer of the element substrate is flat. The insulating coating has poor step coverage, and the use of this insulating coating allows relatively large depressions to be formed in the preexisting depressions. As the coating process proceeds, the wall of each new depression, made from the insulating coating, becomes thicker and finally closes at the top to contain a void therein. As mentioned above, the insulating coating is then ground to some extent, but the voids are kept closed; the insulating coating can have a flat surface despite the presence of the voids. This means that the insulating coating may be thinner than in the case where the depressions are completely plugged up and that the coating process can be finished faster accordingly. Furthermore, less amount of material is needed to form the insulating coating, making the coating process friendly to the environment. Moreover, the grinding process can also be finished relatively fast owing to the small thickness of the insulating coating. These are the reasons why some aspects of the invention make it possible to produce a flat layer on depressions with no need for spending long periods of time for the formation and grinding of the coating covering the depressions. The small thickness of the insulating coating leads to a small amount of the insulating coating to be ground. This offers another advantage, a reduced thickness variability of the ground insulating coating. This accordingly improves the uniformity of the liquid-crystal cell gap and that of the effective voltage applied to the liquid crystals, thereby giving the liquid-crystal apparatus an improved display performance. Furthermore, using an insulating coating to seal the depressions is advantageous in that the coater and the grinder for interlayer or other insulating coatings can be directly used; no additional machines are needed.

Preferably, the insulating coating is formed by CVD (chemical vapor deposition). As mentioned above, the insulating coating should be formed with poor step coverage; CVD is suitable for this requirement.

Preferably, the voids are contained in the depressions at least in part. The use of an insulating coating of poor step coverage allows the depressions to be closed near the rim thereof, and thus the voids are contained in the depressions at least in part. This way of forming the closed voids allows the voids to be closed relatively fast, thereby reducing the time before the coating process can be finished. As a result, the grinding process can also be finished relatively fast. The rapid completion of the coating and grinding of the insulating coating leads to an improved productivity. Furthermore, the thickness variability of the ground insulating coating is reduced.

Another possible constitution is one in which an interlayer insulating coating having contact holes is formed beneath the pixel electrodes, a conductive layer is formed beneath the interlayer insulating coating and connected to the pixel electrodes at the bottom of the contact holes, and the contact holes define the depressions. These depressions formed by contact holes are relatively deep and have a relatively large aspect ratio, and thus constitutions like this one greatly benefit from some aspects of the invention.

Yet another possible constitution is one in which each adjacent pair of the pixel electrodes have a depression therebetween having a depth equal to the thickness of the pixel electrodes.

It may be also allowed that an oriented coating is formed to cover the insulating coating. This constitution provides the oriented coating with a flat surface, hence easier and more precise control of the orientation of the liquid crystals.

Furthermore, the pixel electrodes may be reflective pixel electrodes.

Liquid-crystal apparatuses according to an aspect of the invention can be used in cell-phones, mobile computers, and other electronic devices as well as electronic projection displays. Electronic projecting displays based on any kind of liquid-crystal apparatus according to an aspect of the invention have a light source and projection optics. The light source supplies light to the liquid-crystal apparatus, the liquid-crystal apparatus modulates the light, and then the projection optics project the modulated light.

BRIEF DESCRIPTION OF THE DRAWINGS

The invention will be described with reference to the accompanying drawings, wherein like numbers reference like elements.

FIGS. 5A1 to 5A3 and 5B1 to 5B3 illustrate the advantage of sealing depressions with an insulating coating over known methods for the same purpose.

DESCRIPTION OF EXEMPLARY EMBODIMENTS

The following details embodiments of some aspects of the invention with reference to drawings. In these drawings, layers and other components may be drawn on different scales for visibility.

Incidentally, pixel transistors have source and drain terminals that interchange each time the current flow is reversed. In the following description, however, the terminal connected to a pixel electrode is designated the drain, and the terminal connected to a data line the source.

Embodiment 1
Overall Constitution

Figure 1:
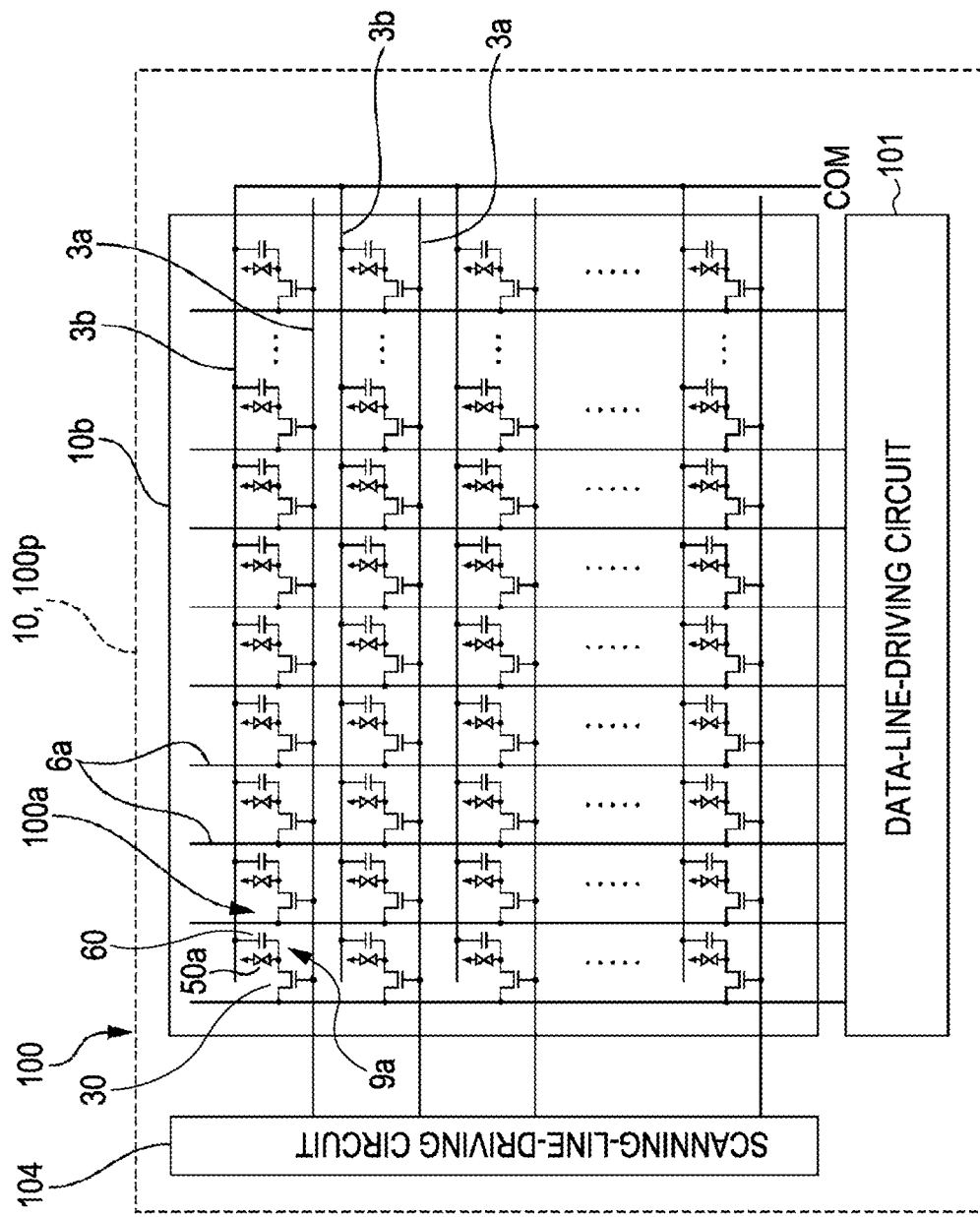
FIG. 1 is a block diagram illustrating the electrical wiring of a liquid-crystal apparatus according to Embodiment 1.
Figure 2A:
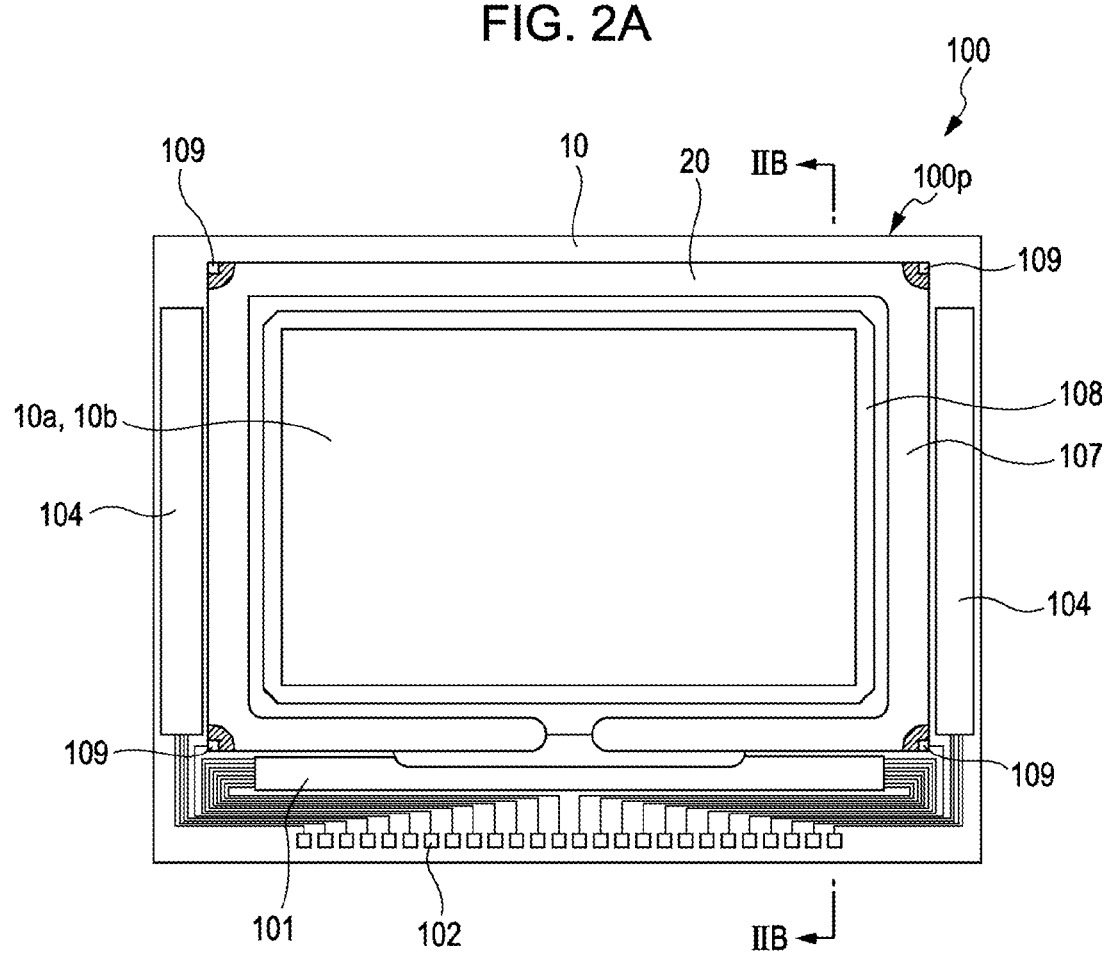
FIGS. 2A and 2B illustrate the same liquid-crystal apparatus in more detail.
Figure 2B:
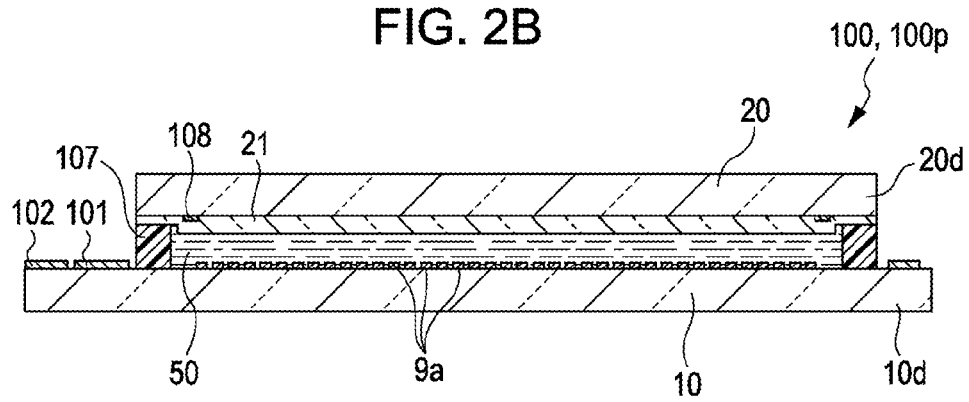

FIG. 1, a block diagram, illustrates the electrical wiring of a liquid-crystal apparatus according to Embodiment 1, and FIGS. 2A and 2B illustrate the same liquid-crystal apparatus in more detail. More specifically, FIG. 2A is a plan view of the liquid-crystal panel and related components of the liquid-crystal apparatus seen from the opposite substrate side, and FIG. 2B a cross-sectional view of FIG. 2A taken along line IIB-IIB.

As illustrated in FIG. 1, this liquid-crystal apparatus 100 has a reflective liquid-crystal panel 100p. This liquid-crystal panel 100p has a pixel field 10b. On the central portion of this pixel field 10b, several pixels 100a are arranged in a matrix. The liquid-crystal panel 100p is based on an element substrate 10 (will be detailed later), and this element substrate 10 has several data lines 6a and several scanning lines 3a extending thereon within the pixel field 10b and crossing each other at right angles; each point of intersection has one of the pixels 100a. Each pixel 100a contains a pixel transistor 30 (a field-effect transistor) and a pixel electrode 9a (will be detailed later). The pixel transistor 30 is electrically connected to one of the data lines 6a via its source terminal, to one of the scanning lines 3a via its gate terminal, and to the pixel electrode 9a via its drain terminal.

The element substrate 10 further has a data-line-driving circuit 101 and a scanning-line-driving circuit 104, both built in the area surrounding the pixel field 10b. The data-line-driving circuit 101 is electrically connected to one end of the individual data lines 6a so that it can give the data lines 6a the image signal transmitted from an image processor. The scanning-line-driving circuit 104 is electrically connected to one end of the individual scanning lines 3a so that it can supply a scanning signal to the scanning lines 3a.

In each pixel 100a, the pixel electrode 9a faces a common electrode formed on the opposite substrate (will be detailed later) with a liquid-crystal layer put therebetween, thereby forming a liquid-crystal capacitor 50a. Each liquid-crystal capacitor 50a has a storage capacitor 60 formed in a parallel configuration, and this storage capacitor 60 prevents the image signal stored in the liquid-crystal capacitor 50a from fluctuating. In this embodiment, several capacitor lines 3b extend along the scanning lines 3a through rows of the pixels 100a to provide the storage capacitors 60.

As illustrated in FIGS. 2A and 2B, the liquid-crystal panel 100p of the liquid-crystal apparatus 100 has a laminate of an element substrate 10, an opposite substrate 20, and a sealant 107 applied between these two substrates to bond them together while spacing them apart. The sealant 107 is applied around the edges of the opposite substrate 20, and it is actually an adhesive agent based on a light-curing resin, a thermosetting resin, or some other appropriate material and contains fiberglass, glass beads, or some other appropriate kind of spacers that keep the distance between the two substrates constant. In this embodiment, the base of the element substrate 10 (element substrate base 10d) and that of the opposite substrate 20 (opposite substrate base 20d) are both light-permeable substrates. However, the element substrate base 10d may be an opaque substrate such as a silicon-single-crystal substrate.

In the area around the sealant 107, the element substrate 10 has the data-line-driving circuit 101 and several terminals 102 formed along one of its edges, and the scanning-line-driving circuits 104 lying along both the next edges. The opposite substrate 20 has at least one vertical communicator 109, which allows the element substrate 10 and the opposite substrate 20 to electrically communicate with each other, at one or more of its corners.

The element substrate 10 further has the pixel electrodes 9a arranged in a matrix. Although will be detailed later, these pixel electrodes 9a are reflective pixel electrodes made of an aluminum-based material such as pure aluminum or aluminum alloys, a silver-based material such as pure silver or silver alloys, or some other appropriate metal-based material, and the matrix of them forms a reflective layer. In this embodiment, the pixel electrodes 9a are made of an aluminum-based material.

On the other hand, the opposite substrate 20 has a frame 108 in the area surrounded by the sealant 107. This frame 108 is made of a light-shielding material and defines an image-display field 10a inside. The opposite substrate 20 further has a common electrode 21, a light-permeable electrode composed of an ITO (indium tin oxide) film. Although not shown in the drawings, the opposite substrate 20 may additionally have a light-shielding film, also known as a black matrix or black stripes, formed to face the pixel electrodes 9a.

In addition, the pixel field 10b may contain dummy pixels coinciding in position with the frame 108 and other appropriate members. In such a case, only the vacant area on the pixel field 10b, namely, the area excluding the dummy pixels, is available for the use as the image-display field 10a.

In this reflective liquid-crystal apparatus 100, the incidence light enters the liquid-crystal apparatus through the opposite substrate 20, is reflected by the pixel electrodes 9a, then modulated in different ways on a pixel-to-pixel basis while going through a liquid-crystal layer 50, and finally exits from the liquid-crystal apparatus through the opposite substrate 20; in this way, the liquid-crystal apparatus displays an image. The opposite substrate 20 has some kind of filter on the side from which the incidence light enters the liquid-crystal apparatus. Examples of the filter include a polarizing film, a phase-difference film, a polarizing plate, and so forth, and appropriate one is chosen depending on the mode of the liquid-crystal layer 50 and placed in an appropriate orientation. Specific examples of the mode of the liquid-crystal layer 50 include operation modes such as TN (twisted nematic) mode and STN (super TN) mode, and tone modes such as NW (normally white) mode and NB (normally black) mode.

When the liquid-crystal apparatus 100 is used as a light valve in an electronic projection display or in other words a liquid-crystal projector (will be detailed later with reference to FIG. 7A), it should be capable of receiving light beams in a full range of colors, and thus the opposite substrate 20 has no color filter. On the other hand, when the liquid-crystal apparatus 100 is used as a direct-vision color display in a mobile computer, a cell-phone, or some other appropriate kind of electronic device (will be detailed later with reference to FIGS. 7B and 7C), the opposite substrate 20 should have a color filter (not shown in the drawings) and a protective coating.

Constitution of Pixels

Figure 3A:
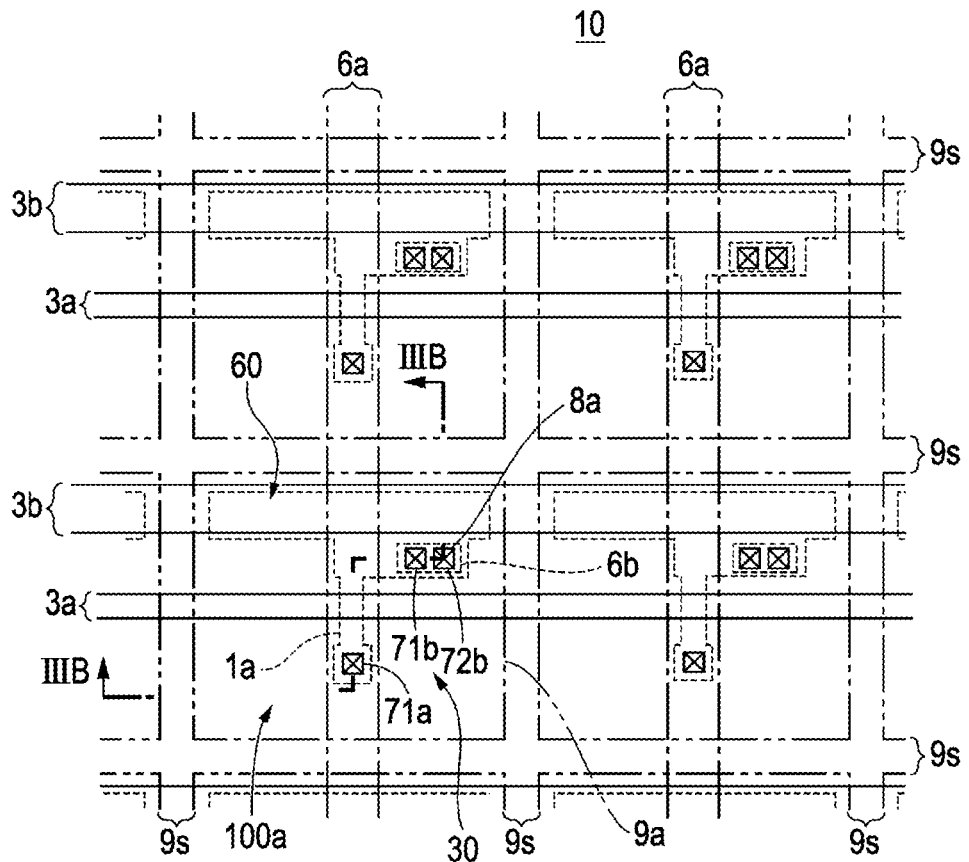
FIGS. 3A and 3B illustrate the pixel arrangement on a reflective liquid-crystal apparatus according to Embodiment 1.
Figure 3B:
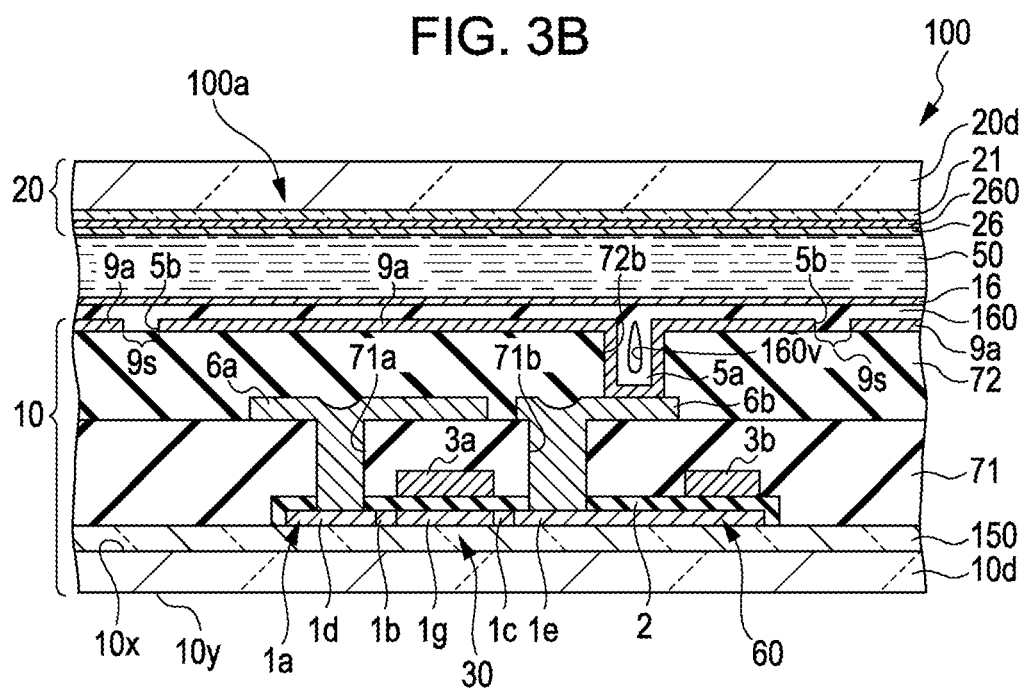

FIGS. 3A and 3B illustrate the pixel arrangement on a reflective liquid-crystal apparatus 100 according to Embodiment 1. More specifically, FIG. 3A is a plan view of some adjacent pairs of pixels on the element substrate 10 of this reflective liquid-crystal apparatus 100, and FIG. 3B is a cross-sectional view of FIG. 3A taken along line IIIB-IIIB. In FIG. 3A, alternate long and short dashed lines define the data lines 6a, solid lines the scanning lines 3a and the capacitor lines 3b, thin broken lines a semiconductor layer 1a, and chain double-dashed lines the pixel electrodes 9a.

As illustrated in FIGS. 3A and 3B, the element substrate 10 has two surfaces on its base, namely, the element substrate base 10d, which is a quartz substrate, a glass substrate, or some other appropriate kind of substrate. These two surfaces are named first surface 10x and second surface 10y, and the first surface 10x, which faces the opposite substrate 20, is covered with a basal insulating layer 150. This basal insulating layer 150 is a light-permeable coating made of silicon dioxide or some other appropriate material and has pixel transistors 30 formed thereon. These pixel transistors 30 are N-channel pixel transistors and coincide in position with the pixel electrodes 9a. The pixel transistors 30 look like islands of the semiconductor layer 1a, which is a polysilicone or single-crystal-semiconductor film, and each pixel transistor 30 has an LDD (lightly-doped drain) structure composed of a channel region 1g, a lightly-doped source region 1b, a heavily-doped source region 1d, a lightly-doped drain region 1c, and a heavily-doped drain region 1e. The semiconductor layer 1a is covered with a gate insulating layer 2, and this gate insulating layer 2 is a silicon dioxide coating, a silicon nitride coating, or some other appropriate kind of coating and is formed by thermally oxidizing the surface of the semiconductor layer 1a. The gate insulating layer 2 supports gate electrodes (the scanning lines 3a) extending thereon, and these gate electrodes are made from a metal coating or a doped silicon coating. The heavily-doped drain region 1e of the semiconductor layer 1a supports the capacitor lines 3b with the gate insulating layer 2 put therebetween, forming the storage capacitors 60.

Note that the pixel transistors 30 may have some other structures, for example, one in which the heavily-doped source region 1a and the heavily-doped drain region 1e are formed in a self-aligned manner to be aligned with the scanning lines 3a. Furthermore, the gate insulating layer 2 may be formed by CVD (chemical vapor deposition) or be a laminate of a silicon dioxide coating formed by thermally oxidizing the surface of the semiconductor layer 1a and another silicon dioxide coating or a silicon nitride coating formed by CVD or some other appropriate method.

The pixel transistors 30 are covered with an interlayer insulating coating 71 and then with another interlayer insulating coating 72. These interlayer insulating coatings are both light-permeating insulating coatings, such as silicon dioxide coatings or silicon nitride coatings. The interlayer insulating coating 71 has the data lines 6a and drain electrodes 6b formed thereon and contact holes 71a and 71b formed therethrough. The data lines 6a and the drain electrodes 6b are both made from a metal coating or a doped silicon coating. The data lines 6a are electrically connected to the heavily-doped source regions ld via the contact holes 71a, whereas the drain electrodes 6b to the heavily-doped drain regions le via the contact holes 71b.

In this embodiment, the interlayer insulating coating 72 is a silicon dioxide coating formed by CVD. The interlayer insulating coating 72 has a flat surface, on which islands of reflective pixel electrodes 9a are formed to individually correspond to pixels 100a and provide a reflective layer. The interlayer insulating coating 72 further has contact holes 72b formed therethrough, and the pixel electrodes 9a are electrically connected to drain electrodes 6b, namely, a conductive coating formed in advance beneath the interlayer insulating coating 72, at the bottom of these contact holes 72b.

The contact holes 72b contain some portion of the pixel electrodes 9a. This portion only thinly covers the bottom and the inner wall of the contact holes 72b, and thus the interlayer insulating coating 72 has depressions 5a on the surface having the pixel electrodes 9a. These depressions 5a are formed to coat the inner wall of the contact holes 72b, and their depth is equal to the thickness of the interlayer insulating coating 72.

The interlayer insulating coating 72 further has other depressions 5b on the surface thereof. These depressions 5b represent the gaps 9s existing between each adjacent pair of the pixel electrodes 9a, and thus their depth is equal to the thickness of the pixel electrodes 9a.

The pixel electrodes 9a are covered with an insulating coating 160 and then with an oriented coating 16. The insulating coating 160 is a basal coating for the oriented coating 16, and this oriented coating 16 is an inorganic, oriented, obliquely deposited coating. The insulating coating 160 has a flat surface as well as it serves as a plugging coating that plugs up the depressions 5a and 5b, thereby allowing the oriented coating 16 to be formed by oblique deposition in a proper way, hence easier and more precise control of the orientation of the liquid-crystal layer 50.

On the other hand, the opposite substrate 20 has an opposite substrate base 20d, and this opposite substrate base 20d is evenly covered with a common electrode 21, an ITO film, on the substantially whole surface facing the element substrate 10. This common electrode 21 is covered with a basal coating 260 and then with an oriented coating 26. The basal coating 260 is a silicon dioxide coating, and the oriented coating 26 is an obliquely deposited coating. The common electrode 21 has a flat surface because it extends over the substantially whole area of the opposite substrate 20. Therefore, the basal coating 260 also has a flat surface. This allows the oriented coating 26 to be formed by oblique deposition in a proper way, thereby further ensuring the easier and more precise control of the orientation of the liquid-crystal layer 50.

Constituted as above, the element substrate 10 and the opposite substrate 20 are positioned in such a manner that the pixel electrodes 9a and the common electrode 21 facing each other, and these two substrates sandwich an electro-optic material, namely, the liquid-crystal layer 50, in the area surrounded by the sealant 107. When no electric field is emitted from the pixel electrodes 9a, liquid crystals in this liquid-crystal layer 50 are directed to a certain orientation under the effect of the element substrate oriented coating 16 and the opposite substrate oriented coating 26. The liquid-crystal layer 50 may be a single kind of nematic liquid crystals, a mixture of two or more kinds of nematic liquid crystals, or have some other appropriate constitution.

Plugging up the Depressions 5a

In a liquid-crystal apparatus 100 constituted as above, the insulating coating 160, a component of the element substrate 10, serves as a plugging coating that plugs up the depressions 5a and 5b. As mentioned above, the depressions 5a are depressions formed to coat the inner wall of the contact holes 72b in the interlayer insulating coating 72, and the depressions 5b represent the gaps 9s existing between each adjacent pair of the pixel electrodes 9a.

The depressions 5b have a relatively small aspect ratio and thus are completely plugged up with the insulating coating 160. In this embodiment, the depressions 5b have an aspect ratio smaller than 0.7.

On the other hand, the depressions 5a have a relatively large aspect ratio, more specifically, an aspect ratio equal to or larger than 0.7. For example, when the contact holes 72b measure 0.75 μm in diameter and 0.6 μm in depth, the depressions 5b have an aspect ratio of 0.8. This relatively large aspect ratio of the depressions 5a allows the insulating coating 160 to contain closed voids 160v in the depressions 5a and each void 160v to be substantially completely contained in each depression 5a, or in each contact hole 72b. Note that these voids 160v are not open but closed at the top by the insulating coating 160; the insulating coating 160 has a flat surface. The voids 160v are formed during the formation of the insulating coating 160 when the liquid-crystal apparatus 100 is manufactured in accordance with the process described later with reference to FIGS. 4A to 4D and FIGS. 5A1 to 5A3. This embodiment makes positive use of these voids 160v.

Method for Manufacturing the Liquid-Crystal Apparatus 100

The following describes a method for manufacturing a liquid-crystal apparatus 100 according to an aspect of the invention with reference to FIGS. 4A to 4D and details the constitution of this liquid-crystal apparatus 100. FIGS. 4A to 4D illustrate a method for manufacturing a liquid-crystal apparatus 100 according to Embodiment 1, including processes from forming the interlayer insulating coating 72 having the contact holes 72b to forming the insulating coating 160 having a flat surface.

Figure 4A:
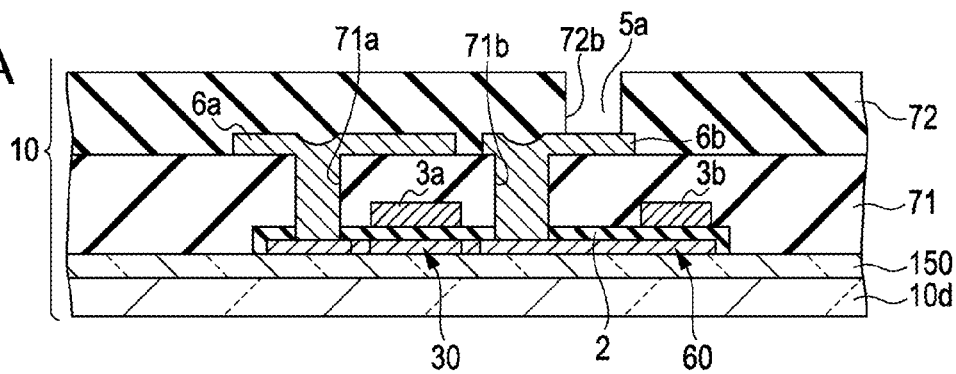
FIGS. 4A to 4D illustrate a method for manufacturing a liquid-crystal apparatus according to Embodiment 1.

First, in the manufacturing process of an element substrate 10, an interlayer insulating coating 72 is formed to have contact holes 72b as illustrated in FIG. 4A. More specifically, this interlayer insulating coating 72 is formed by CVD or some other appropriate method from silicon dioxide or some other appropriate material. The obtained interlayer insulating coating 72 is ground to be flat, and then the contact holes 72b are formed through the interlayer insulating coating 72 by photolithography.

Figure 4B:
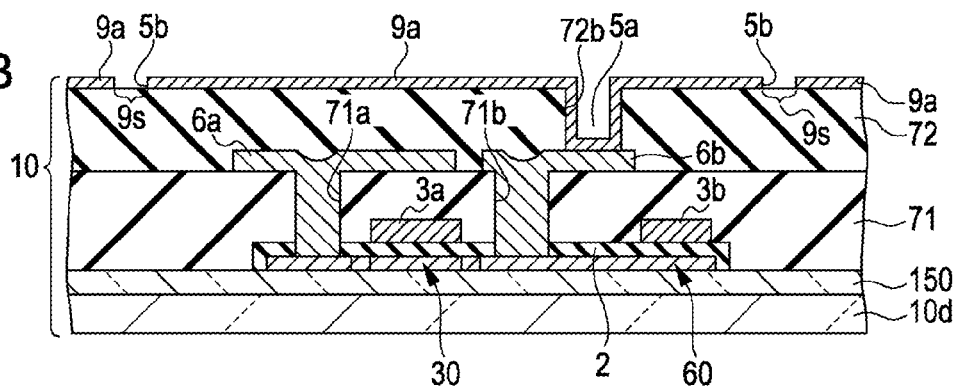

Then, as illustrated in FIG. 4B, pixel electrodes 9a are formed in the island structure. More specifically, a reflective metal layer is first formed by sputtering from pure aluminum, an aluminum alloy, or some other appropriate kind of metal to a thickness of about 200 nm, and then the obtained reflective metal layer is photolithographically patterned to have islands of the pixel electrodes 9a. As a result, the pixel electrodes 9a are electrically connected to drain electrodes 6b, namely, a conductive coating formed in advance beneath the interlayer insulating coating 72, at the bottom of the contact holes 72b. These contact holes 72b contain some portion of the pixel electrodes 9a; however, this portion only thinly covers the bottom and the inner wall of the contact holes 72b. As a result, the interlayer insulating coating 72 (and the pixel electrodes 9a) has depressions 5a formed to coat the inner wall of the contact holes 72b on the surface thereof. Furthermore, the gaps 9s existing between each adjacent pair of the pixel electrodes 9a form depressions 5b.

Figure 4C:
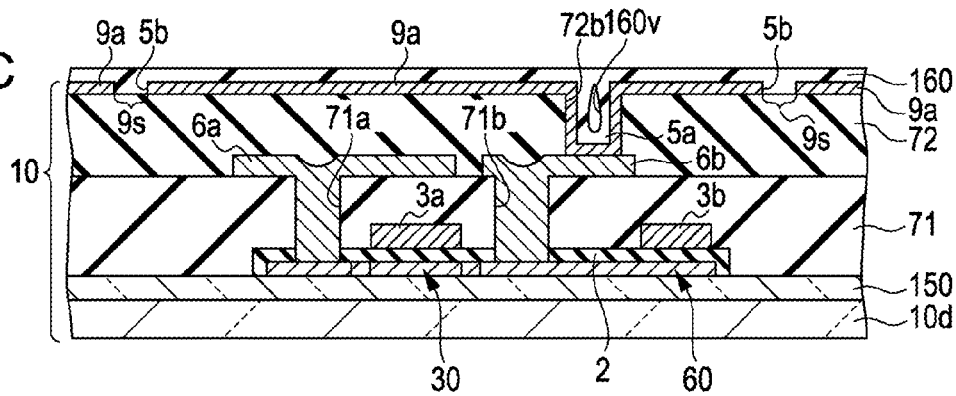
Figure 4D:
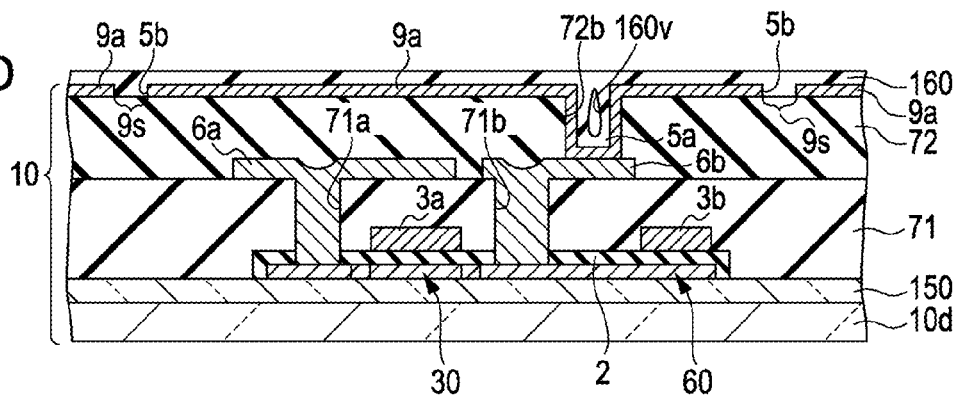

Then, as illustrated in FIG. 4C, an insulating coating 160 is formed to cover the pixel electrodes 9a. More specifically, this insulating coating 160 is a silicon dioxide coating formed by plasma CVD. Then, as illustrated in FIG. 4D, the insulating coating 160 is ground to be flat and have a thickness equal to or smaller than 500 nm, for example, a thickness in the range of 200 to 400 nm, when measured in the portion lying on the pixel electrodes 9a. Chemical mechanical planarization (CMP) may be used here; it combines the action of a chemical component contained in a polishing agent with the movement of a grinding material over the element substrate 10 for the rapid formation of a smooth surface. More specifically, the element substrate 10 is held on a holder and then allowed to rotate in contact with a grinding plate that is also rotating. This grinding plate has a pad stuck thereto, and this pad is made of nonwoven fabric, foamed polyurethane, porous fluororesin, or some other appropriate material. On the other hand, the polishing agent is, for example, an aqueous polishing agent containing cerium oxide particles with an average particle diameter in the range of 0.01 to 20 μm, an acrylic acid ester derivative as a dispersant, and water, and is applied to fill the gap between the pad and the element substrate 10. The flattened insulating coating 160 may be further ground by etching; however, the voids 160v should not be opened.

Subsequently, as illustrated in FIG. 3B, an oriented coating 16 is formed on the insulating coating 160 by oblique deposition.

Details of the Formation and Grinding of the Insulating Coating 160

FIGS. 5A1 to 5A3 and 5B1 to 5B3 illustrate the advantage of sealing the depressions 5a with the insulating coating 160 over known methods for the same purpose. More specifically, FIGS. 5A1 to 5A3 illustrate a way of sealing the depressions 5a in accordance with this embodiment, and FIGS. 5B1 to 5B3 a comparative way.

As described above with reference to FIGS. 4C and 4D, this embodiment involves the formation and grinding of an insulating coating to make the depressions 5a sealed. This insulating coating, namely, the insulating coating 160, can be formed in various ways including PVD (physical vapor deposition) techniques such as sputtering, vacuum deposition, and ion plating as well as CVD. In this embodiment, however, the insulating coating 160 is a silicon dioxide coating formed by plasma CVD. In general, silicon dioxide coatings formed by plasma CVD have poor step coverage; this embodiment makes positive use of this nature.

More specifically, a way of sealing the depressions 5a in accordance with this embodiment is as follows: As illustrated in FIG. 5A1, forming a silicon oxide coating, the insulating coating 160, by plasma CVD allows relatively large depressions to be formed in the preexisting depressions 5a; As the coating process proceeds, the wall of each new depression becomes thicker and finally closes at the top to contain a closed void 160v therein as illustrated in FIG. 5A2. In this embodiment, the insulating coating 160 is then ground to some extent, but the voids 160v are kept closed; the insulating coating 160 can have a flat surface despite the presence of the voids 160v. This means that this way of sealing the depressions 5a allows the insulating coating 160 to have a thickness t0 smaller than the depth of the depressions 5a and the coating process to be finished faster accordingly, compared with the comparative way illustrated in FIGS. 5B1 to 5B3. Furthermore, the grinding process can also be finished relatively fast owing to the small thickness t0 of the insulating coating 160, or in other words, because the portion to be removed from the insulating coating 160 has a relatively small thickness t1. Moreover, the fact that the thickness t1 is relatively small offers another advantage, a reduced thickness variability of the ground insulating coating 160.

On the other hand, the comparative way illustrated in FIGS. 5B1 to 5B3 requires that the depressions 5a are completely plugged up with an insulating coating 161 as illustrated in FIGS. 5B1 and 5B2. The insulating coating 161 should have a larger thickness t10 than in the way according to this embodiment, and it takes longer to finish the coating process accordingly. Furthermore, it also takes longer to finish the grinding process owing to the relatively large thickness t10 of the insulating coating 161, or in other words, because the portion to be removed from the insulating coating 161 has a relatively large thickness t11 as illustrated in FIG. 5B3. Moreover, the fact that the thickness t11 is relatively large leads to another problem, an increased thickness variability of the ground insulating coating 161.

Key Advantages of Embodiment 1

A liquid-crystal apparatus 100 according to this embodiment contains depressions 5a with a relatively large aspect ratio beneath its insulating coating 160; however, this insulating coating 160 is formed by CVD and thus can seal the depressions 5a, thereby ensuring that both the surface supporting the oriented coating 16 used in this liquid-crystal apparatus 100 (the surface of the insulating coating 160) and the uppermost surface of the element substrate 10 used in this liquid-crystal apparatus 100 (the surface of the oriented coating 16) are flat. This allows the oriented coating 16 to be formed in a proper way and the liquid-crystal layer 50 used in this liquid-crystal apparatus 100 to have a uniform thickness, hence easier and more precise control of the orientation of the liquid-crystal layer 50.

Furthermore, the insulating coating 160 covering the depressions 5a is a silicon dioxide coating formed by plasma CVD and thus has poor step coverage. This allows the insulating coating 160 to contain closed voids 160v in which the pressure is low. The insulating coating 160 is then ground to some extent, but the voids 160v are kept closed; the insulating coating 160 can have a flat surface despite the presence of the voids 160v. During the coating process, the insulating coating 160 becomes thicker in the depressions 5a and finally closes the depressions 5a at the top, and this allows the insulating coating 160 to have a smaller thickness than in the case where the depressions 5a are completely plugged up. Moreover, the voids 160v are contained in the depressions 5a at least in part because the poor step coverage of the insulating coating 160 allows the depressions 5a to be closed near the rim thereof. This means that the voids 160v are closed at a relatively early stage of the coating process and that the coating process can be finished relatively fast. Additionally, the grinding process can also be finished relatively fast owing to the small thickness of the insulating coating 160, or in other words, because the portion to be removed from the insulating coating 160 is thin. Consequently, this embodiment makes it possible to seal the depressions 5a with no need for spending long periods of time for the formation and grinding of the coating covering the depressions 5a. Furthermore, this embodiment offers another advantage, a reduced thickness variability of the insulating coating 160. This accordingly improves the uniformity of the liquid-crystal cell gap and that of the effective voltage applied to liquid crystals in the liquid-crystal layer 50, thereby giving the liquid-crystal apparatus 100 an improved display performance.

Furthermore, using a silicon dioxide coating as the insulating coating 160 to seal the depressions 5a is advantageous in that the coater and the grinder for interlayer or other insulating coatings can be directly used; no additional machines are needed.

Embodiment 2

Figure 6A:
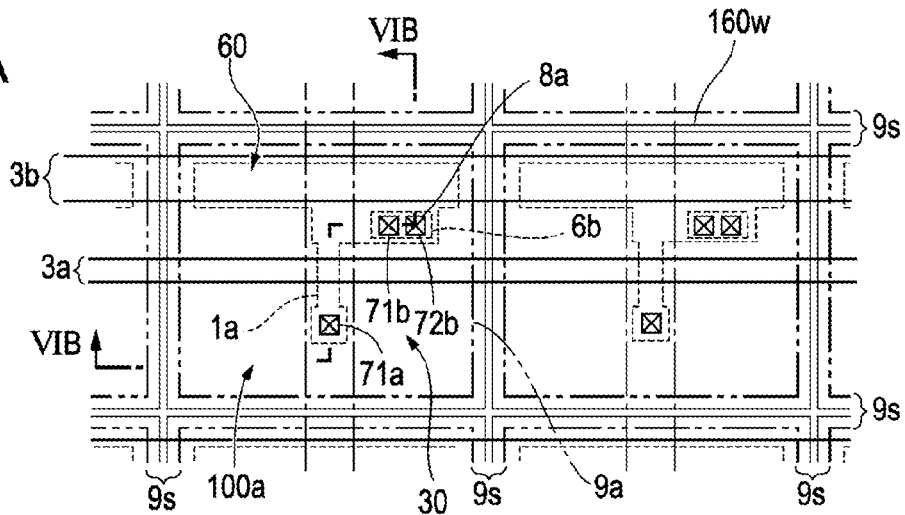
FIGS. 6A to 6C illustrate a liquid-crystal apparatus according to Embodiment 2.
Figure 6B:
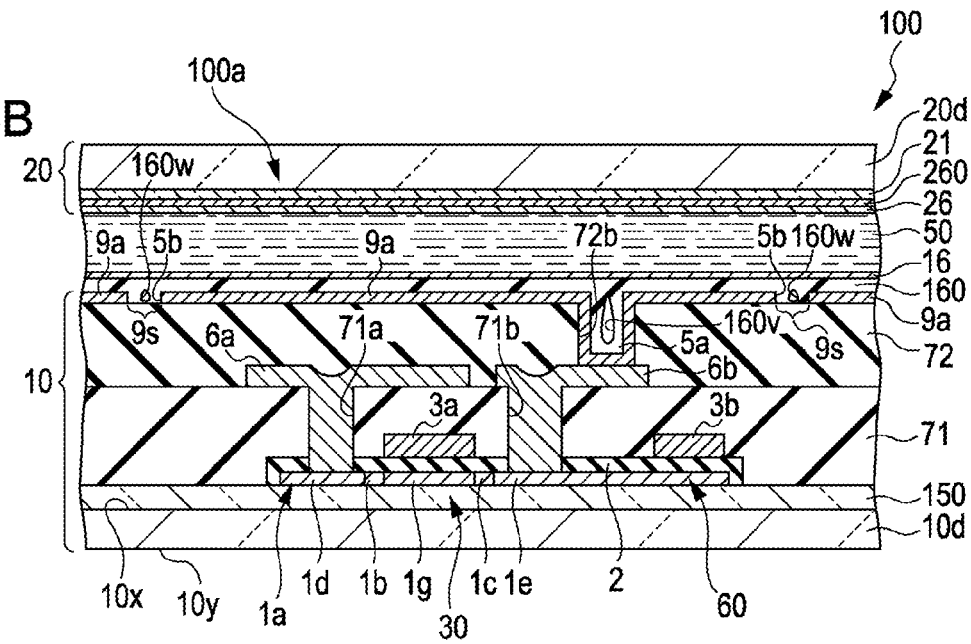
Figure 6C:
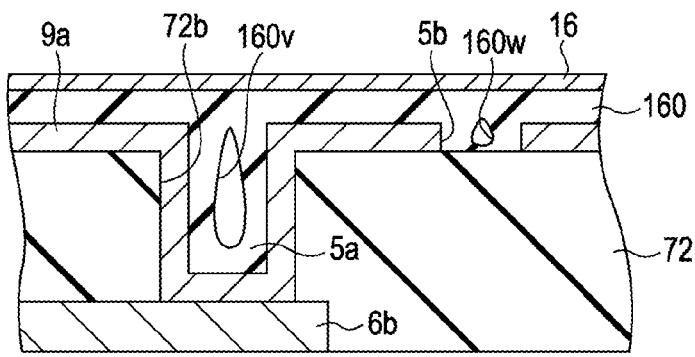

FIGS. 6A to 6C illustrate a liquid-crystal apparatus 100 according to Embodiment 2. More specifically, FIG. 6A is a plan view of an adjacent pair of pixels on the element substrate 10 of this liquid-crystal apparatus 100, FIG. 6B a cross-sectional view of FIG. 6A taken along ling VIB-VIB, and FIG. 6C an enlarged cross-sectional diagram illustrating a depression 5a, another depression 5b, and surroundings. Embodiment 2 has basically the same constitution as Embodiment 1; the components common for both embodiments are referenced by like numbers in the drawings involved and are not detailed here.

As illustrated in FIGS. 6A to 6C, the element substrate 10 of a liquid-crystal apparatus 100 according to this embodiment has a constitution similar to that of the one described in Embodiment 1 as follows. The element substrate 10 has an insulating coating 72, and this insulating coating 72 is a silicon dioxide coating formed by CVD. The interlayer insulating coating 72 has a flat surface, on which islands of reflective pixel electrodes 9a are formed to individually correspond to pixels 100a and provide a reflective layer. The interlayer insulating coating 72 further has contact holes 72b formed therethrough, and the pixel electrodes 9a are electrically connected to drain electrodes 6b, namely, a conductive coating formed in advance beneath the interlayer insulating coating 72, at the bottom of these contact holes 72b. The contact holes 72b contain some portion of the pixel electrodes 9a. This portion only thinly covers the bottom and the inner wall of the contact holes 72b, and thus the interlayer insulating coating 72 has depressions 5a on the surface having the pixel electrodes 9a. These depressions 5a are formed to coat the inner wall of the contact holes 72b, and their depth is equal to the thickness of the interlayer insulating coating 72. The interlayer insulating coating 72 further has other depressions 5b on the surface thereof. These depressions 5b represent the gaps 9s existing between each adjacent pair of the pixel electrodes 9a, and thus their depth is equal to the thickness of the pixel electrodes 9a. The depressions 5a have a relatively large aspect ratio, more specifically, an aspect ratio equal to or larger than 0.7. This relatively large aspect ratio of the depressions 5a allows an insulating coating 160, a coating formed to cover the depressions 5a, to contain closed voids 160v in the depressions 5a and each void 160v to be substantially completely contained in each depression 5a, or in each contact hole 72b. These voids 160v are not open but closed at the top by the insulating coating 160; the insulating coating 160 has a flat surface. The voids 160v are formed during the formation of the insulating coating 160 when the liquid-crystal apparatus is manufactured in accordance with the process described above with reference to FIGS. 4A to 4D and FIGS. 5A1 to 5A3.

This embodiment has additional features for a more improved display performance of the liquid-crystal apparatus 100. For example, the gaps 9s existing between each adjacent pair of the pixel electrodes 9a are relatively narrow, and thus the depressions 5b have a relatively large aspect ratio, more specifically, an aspect ratio equal to or larger than 0.7. As a result, the insulating coating 160 have another set of closed voids, voids 160w, in the depressions 5b, besides the voids 160v in the depressions 5a, and each void 160w is substantially completely contained in each depression 5b. As with the voids 160v, the voids 160w are not open but closed at the top by the insulating coating 160 and thus do not make the insulating coating 160 uneven, and they are formed during the formation of the insulating coating 160 when the liquid-crystal apparatus 100 is manufactured in accordance with the process described above with reference to FIGS. 4A to 4D and FIGS. 5A1 to 5A3. As illustrated in FIG. 6A, the voids 160w extend between each adjacent pair of the pixel electrodes 9a, or along the gaps 9s.

As with the one described in Embodiment 1, a liquid-crystal apparatus 100 according to this embodiment contains depressions 5a and 5b with a relatively large aspect ratio beneath its insulating coating 160; however, this insulating coating 160 is formed by CVD and thus can seal the depressions 5a and 5b, thereby ensuring that both the surface supporting the oriented coating 16 used in this liquid-crystal apparatus 100 (the surface of the insulating coating 160) and the uppermost surface of the element substrate 10 used in this liquid-crystal apparatus 100 (the surface of the oriented coating 16) are flat. This allows the oriented coating 16 to be formed in a proper way and the liquid-crystal layer 50 used in this liquid-crystal apparatus 100 to have a uniform thickness, hence easier and more precise control of the orientation of the liquid-crystal layer 50.

Furthermore, as with the insulating coating 160 used in Embodiment 1, the insulating coating 160 covering the depressions 5a and 5b is a silicon dioxide coating formed by CVD. This allows the insulating coating 160 to have a relatively small thickness and the coating process to be finished relatively fast accordingly. Furthermore, the grinding process can also be finished relatively fast owing to the small thickness of the insulating coating 160, or in other words, because the portion to be removed from the insulating coating 160 is thin. Moreover, this embodiment offers another advantage, a reduced thickness variability of the insulating coating 160. This accordingly improves the uniformity of the liquid-crystal cell gap and that of the effective voltage applied to liquid crystals in the liquid-crystal layer 50, thereby giving the liquid-crystal apparatus 100 an improved display performance.

Other Embodiments

Embodiments 1 and 2 individually represent reflective liquid-crystal apparatuses 100; however, some aspects of the invention can be applied to transmissive liquid-crystal apparatuses.

Use in Electronic Devices

Figure 7A:
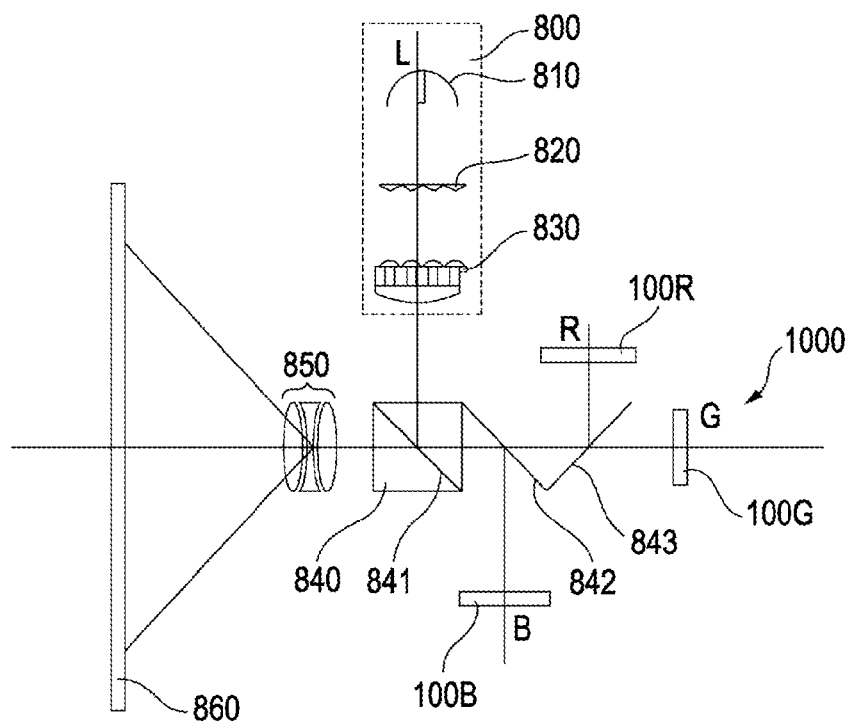
FIGS. 7A to 7C illustrate some electronic devices equipped with a reflective liquid-crystal apparatus according to an aspect of the invention.
Figure 7B:
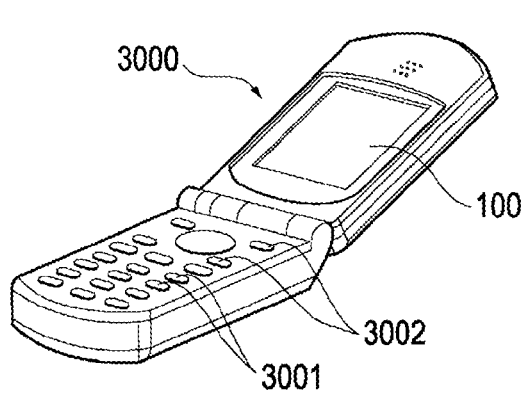
Figure 7C:
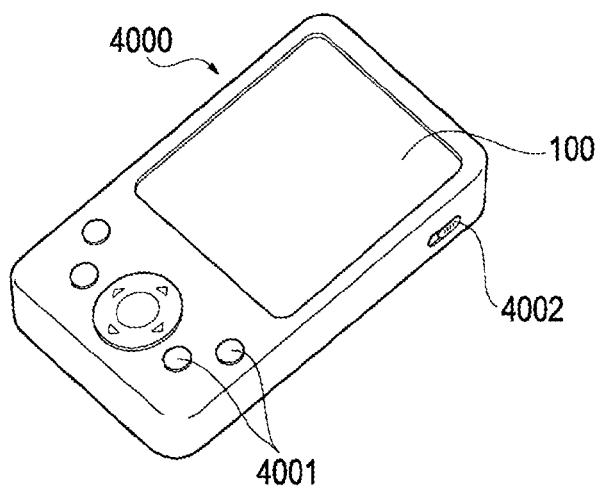

Reflective liquid-apparatuses 100 according to an aspect of the invention can be used in electronic projection displays (liquid-crystal projectors) like the one illustrated in FIG. 7A and also in portable electronic devices like those illustrated in FIGS. 7B and 7C.

The electronic projection display 1000 illustrated in FIG. 7A has a polarized-illumination system 800, and this polarized-illumination system 800 contains a light source 810, an integrator lens 820, and a polarization converter 830 arranged along an optical axis L. This electronic projection display 1000 further has a polarized-beam splitter 840 and two dichroic mirrors 842 and 843. The polarized-beam splitter 840 has a mirror 841, and S-polarized beams emitted from the polarized-illumination system 800 are reflected by this mirror 841. The S-polarized beams reflected by the mirror 841 reach the dichroic mirror 842 and are split into blue (B) and other components there. The components in colors other than blue then reach the dichroic mirror 843 and are split into red (R) and other components there. Incidentally, this electronic projection display 1000 further has three liquid-crystal apparatuses 100 for three colors (100R, 100G, and 100B). These liquid-crystal apparatuses 100R, 100G, and 100B individually modulate light beams coming thereinto, then the dichroic mirrors 842 and 843 and the polarized-beam splitter 840 synthesize the modulated light beams, and finally projection optics 850 project the synthesized light onto a screen 860.

FIG. 7B illustrates a cell-phone 3000. This cell-phone 3000 has buttons 3001, scroll keys 3002, and a liquid-crystal apparatus 100 as a display unit. Users can scroll through the information displayed on the liquid-crystal apparatus 100 by using the scroll keys 3002. On the other hand, FIG. 7C illustrates a personal digital assistant (PDA) 4000. This PDA 4000 has buttons 4001, a power switch 4002, and a liquid-crystal apparatus 100 as a display unit; once turned on via the power switch 4002, the PDA 4000 displays an address book, a schedule, and other kinds of information upon the user's request.

Incidentally, liquid-crystal apparatuses 100 according to an aspect of the invention may have color filters for color display on the opposite substrate 20 or some other component. Liquid-crystal apparatuses 100 having color filters can be used to constitute single-plate projection displays.

Electronic devices in which liquid-crystal apparatuses 100 according to an aspect of the invention can be used are not limited to those illustrated in FIGS. 7A to 7C. Examples include head-mounted displays, digital still cameras, liquid-crystal display televisions, view finders, recorders, car navigation systems, pagers, electronic organizers, electronic calculators, word processors, workstations, videophones, point-of-sale (POS) terminals, automated teller machines (ATMs), and many other electronic devices.

What is claimed is:

1. A liquid-crystal apparatus comprising:
   an element substrate;
   a plurality of pixel transistors arranged over the element substrate;
   a plurality of pixel electrodes corresponding to the plurality of pixel transistors, each of the plurality of pixel electrodes having a depression; and
   an insulating layer formed over the plurality of pixel electrodes, wherein:

the depression comprises a contact hole coated with at least part of a corresponding pixel electrode and at least part of the insulating layer, and the insulating layer having at least one void, the at least one void being closed by the insulating layer, and at least part of the at least one void being located in the depression.

2. The liquid-crystal apparatus according to claim 1, further comprising:

an interlayer insulating layer formed under the plurality of pixel electrodes and having contact holes; and a conductive layer formed under the interlayer insulating layer and connected to the pixel electrodes at the bottom of the contact holes, wherein:

the contact holes define the depressions.

3. The liquid-crystal apparatus according to claim 1, wherein:

each adjacent pair of the pixel electrodes having a depression, a depth of the depression being equal to a thickness of the pixel electrodes.

4. The liquid-crystal apparatus according to claim 1, further comprising:

an oriented film formed over the insulating layer.

5. The liquid-crystal apparatus according to claim 1, wherein:

the pixel electrodes being reflective pixel electrodes.

6. An electronic device comprising the liquid-crystal apparatus according to claim 1.

7. A liquid-crystal apparatus comprising:

an element substrate;

a plurality of pixel transistors arranged over the element substrate;

a plurality of pixel electrodes, one of the plurality of pixel electrodes being electrically connected to one of the plurality of pixel transistors;

a first insulating layer that covers the plurality of pixel transistors, the first insulating layer having an opening to electrically connect the one of the plurality of pixel electrodes and the one of the plurality of pixel transistors; and a second insulating layer that covers the plurality of pixel electrodes, the second insulating layer having at least one void at an area of the opening in plan view.

8. The liquid-crystal apparatus according to claim 7, wherein a part of the one of the plurality of pixel electrodes is disposed in the opening.

9. The liquid-crystal apparatus according to claim 7, wherein the at least one void is disposed in the opening.

10. The liquid-crystal apparatus according to claim 7, wherein each of the plurality of pixel electrodes is metal.

* * * * *